(12) United States Patent
Sakuma

(10) Patent No.: US 6,588,832 B2
(45) Date of Patent: Jul. 8, 2003

(54) VEHICLE FRONT BODY STRUCTURE

(75) Inventor: Wataru Sakuma, Novi, MI (US)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/277,887

(22) Filed: Oct. 23, 2002

(65) Prior Publication Data

US 2003/0080588 A1 May 1, 2003

(51) Int. Cl.$^7$ ................................................ B62D 21/15
(52) U.S. Cl. .................................. 296/204; 296/203.01
(58) Field of Search ....................... 296/203.01, 203.02, 296/204, 185, 30, 187, 188, 189

(56) References Cited

U.S. PATENT DOCUMENTS

| | | | | |
|---|---|---|---|---|
| 3,940,176 A | * | 2/1976 | Ito et al. ...................... | 296/188 |
| 4,898,419 A | * | 2/1990 | Kenmochi et al. .......... | 296/204 |
| 5,685,599 A | | 11/1997 | Kitagawa | |
| 5,988,734 A | * | 11/1999 | Longo et al. .......... | 296/203.01 |
| 6,099,039 A | * | 8/2000 | Hine .......................... | 296/204 |
| 6,206,460 B1 | * | 3/2001 | Seeliger et al. ............. | 296/204 |
| 6,270,153 B1 | * | 8/2001 | Toyao et al. ................ | 296/204 |
| 6,431,641 B2 | * | 8/2002 | Miyasaka .............. | 296/203.03 |
| 6,460,918 B1 | * | 10/2002 | Sato et al. .................. | 296/204 |
| 6,491,337 B2 | * | 12/2002 | Averdiek et al. ............ | 296/204 |

FOREIGN PATENT DOCUMENTS

| | | |
|---|---|---|
| DE | 39 32 295 A1 | 4/1991 |
| EP | 0 602 331 A1 | 6/1994 |
| JP | 11-78959 | 3/1999 |
| JP | 2000-159145 A | 6/2000 |
| JP | 2000-168614 | 6/2000 |

* cited by examiner

Primary Examiner—Dennis H. Pedder
Assistant Examiner—Greg Blankenship
(74) Attorney, Agent, or Firm—McDermott, Will & Emery

(57) ABSTRACT

A vehicle front body structure includes a floor panel, front side members under the floor panel extending in the vehicle longitudinal direction, a sub-frame fixed at its front and rear fixing points to the front side members, and reinforcing members fixed to the floor panel. The rear fixing points of the sub-frame are located on transversely inner side of the front fixing points thereof. Each of the reinforcing members extends substantially in parallel to a straight line passing through the front and rear fixing points on transversely same side of the sub-frame. The front part of the reinforcing member is connected to a vicinity of the rear fixing point of the sub-frame and a rear part thereof is connected to a floor tunnel of the floor panel extending in a vehicle longitudinal direction.

4 Claims, 6 Drawing Sheets

VEHICLE FRONT BODY STRUCTURE

BACKGROUND OF THE INVENTION

1. Field of Invention

The present invention relates to a vehicle front body structure.

2. Description of Related Art

In a conceivable vehicle front body structure, illustrated in FIG. 6 and FIG. 7, a front floor 1 and a dash floor 2 are composed of a center floor panel 4 at a central region in a vehicle transverse direction 3 of the floors 1 and 2, and floor panels 5 on transversely outer sides of the center floor panel 4. On a central section of the center floor panel 4, a floor tunnel 7 extends in a vehicle longitudinal direction 6. On transversely outer sides of the floor tunnel 7, reinforcing members 8 extends in parallel thereto. Under the floor panels 5, front side members 9 extend in the vehicle longitudinal direction 6, on each of which a suspension fitting portion 10 is provided.

SUMMARY OF THE INVENTION

In the vehicle front body structure, however, since the reinforcing members 8 extend parallel to the floor tunnel 7 in the vehicle longitudinal direction 6, the reinforcing members 8 are subject to axial loads and create large reaction forces in the event of a full-lap collision. On the contrary, in the event of an offset collision, the reinforcing members 8 are subject to bending loads and create small reaction forces.

Moreover, due to the above-described structure, the reinforcing members 8 do not function as stiffening members of a sub-frame. Therefore, it is necessary to separately provide stiffening members, resulting in increases in cost and weight.

An object of the present invention is to provide a vehicle front body structure creating controlled reaction forces upon collision, which is light in weight and low in cost.

An aspect of the present invention is a vehicle front body structure comprising: a floor panel with a floor tunnel extending in a vehicle longitudinal direction; front side members provided under the floor panel, extending in the vehicle longitudinal direction; a sub-frame fixed at its front and rear fixing points to the front side members, the rear fixing points being located on inner side in a vehicle transverse direction of the front fixing points; and reinforcing members fixed to the floor panel, each extending substantially in parallel to a straight line passing through the front and rear fixing points on transversely same side of the sub-frame, a front part thereof connected to a vicinity of the rear fixing point of the sub-frame and a rear part thereof connected to the floor tunnel of the floor panel.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
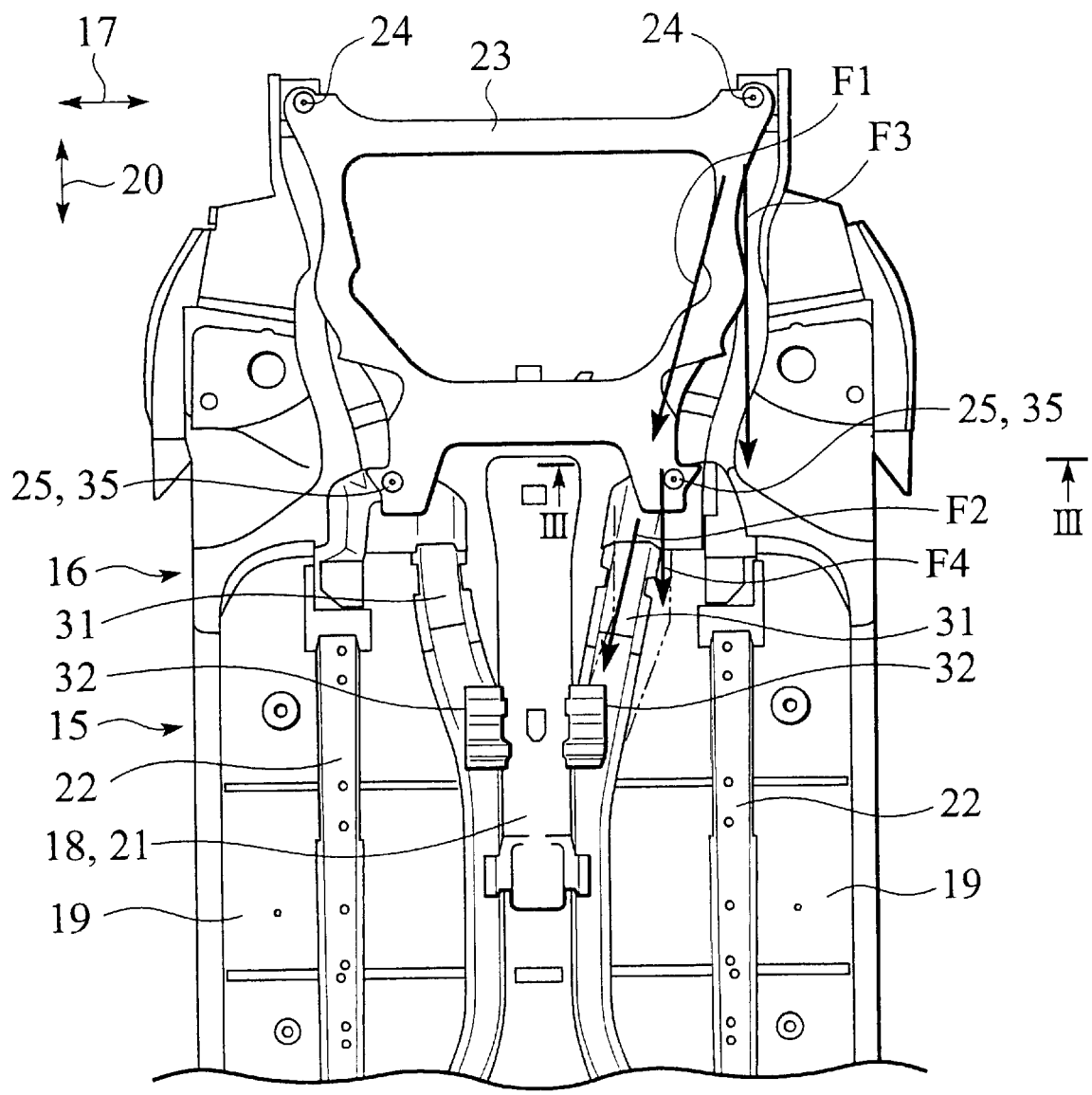
FIG. 1 is a bottom view of a vehicle front body structure according to an embodiment of the present invention, showing reinforcing members.
Figure 2:
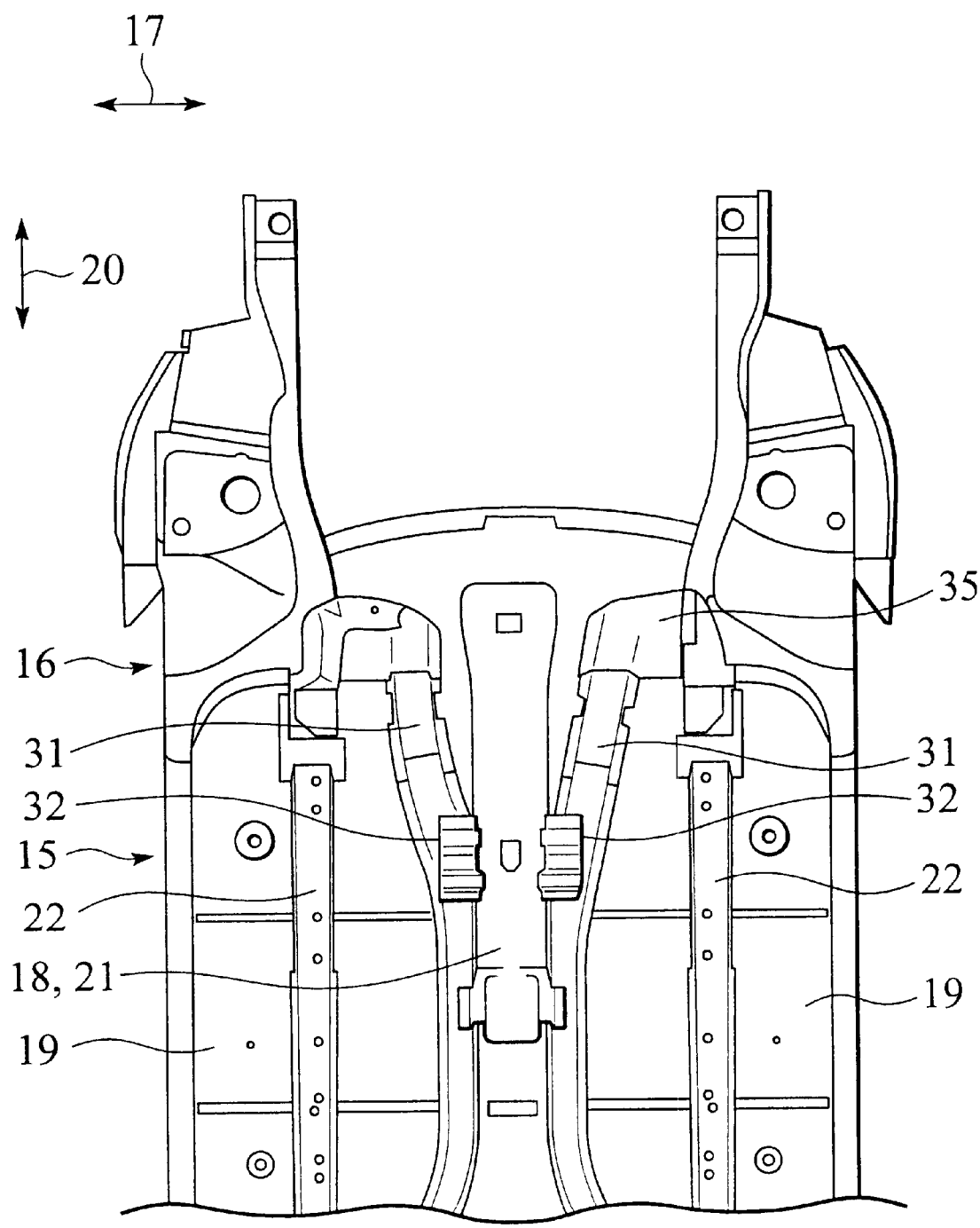
FIG. 2 is another bottom view of the vehicle front body structure of FIG. 1, with a sub-frame removed for clarity.
Figure 3:
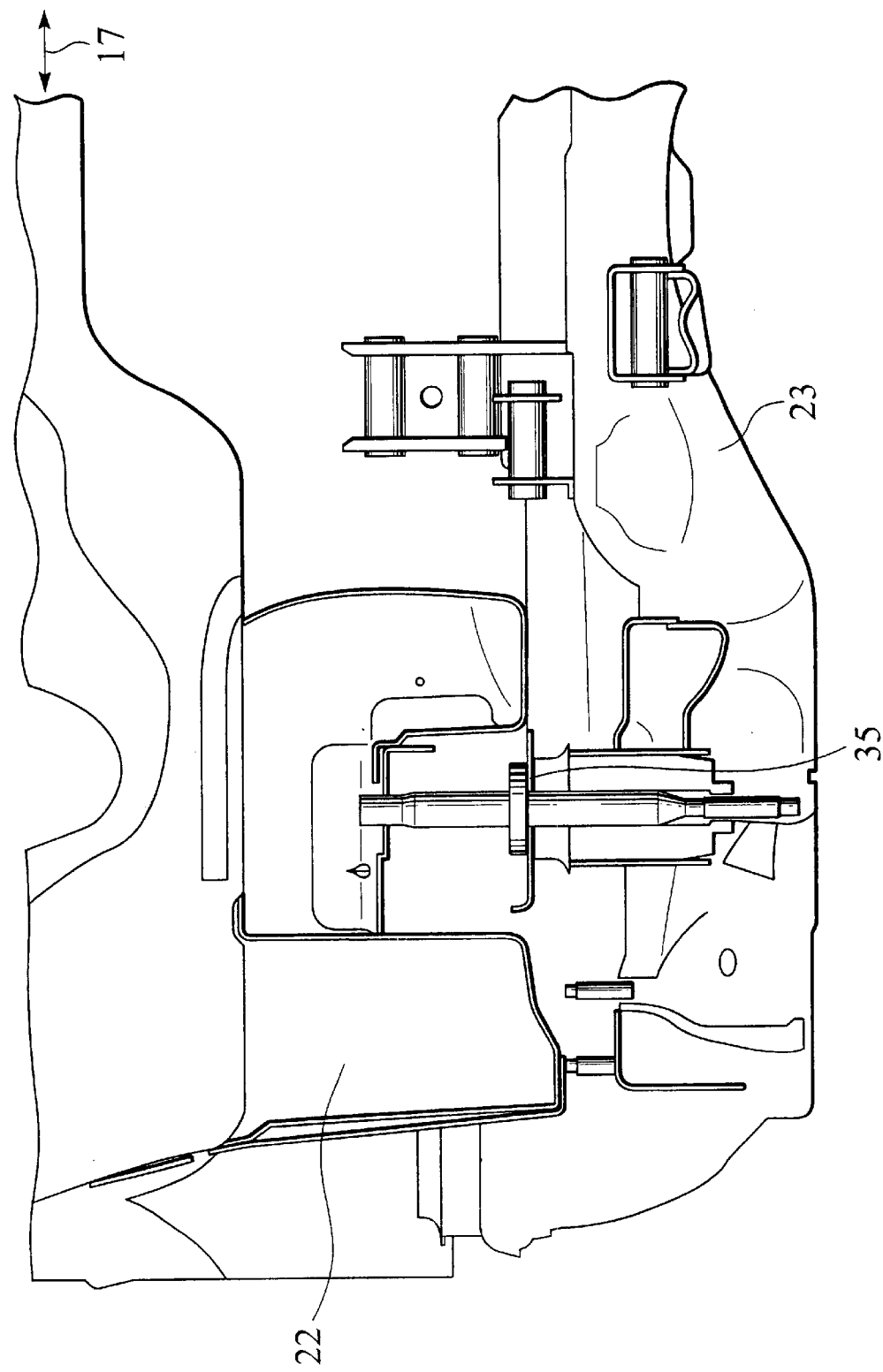
FIG. 3 is a cross-sectional view of a suspension fitting portion of the vehicle front body structure, taken along the III—III line of FIG. 1.
Figure 4:
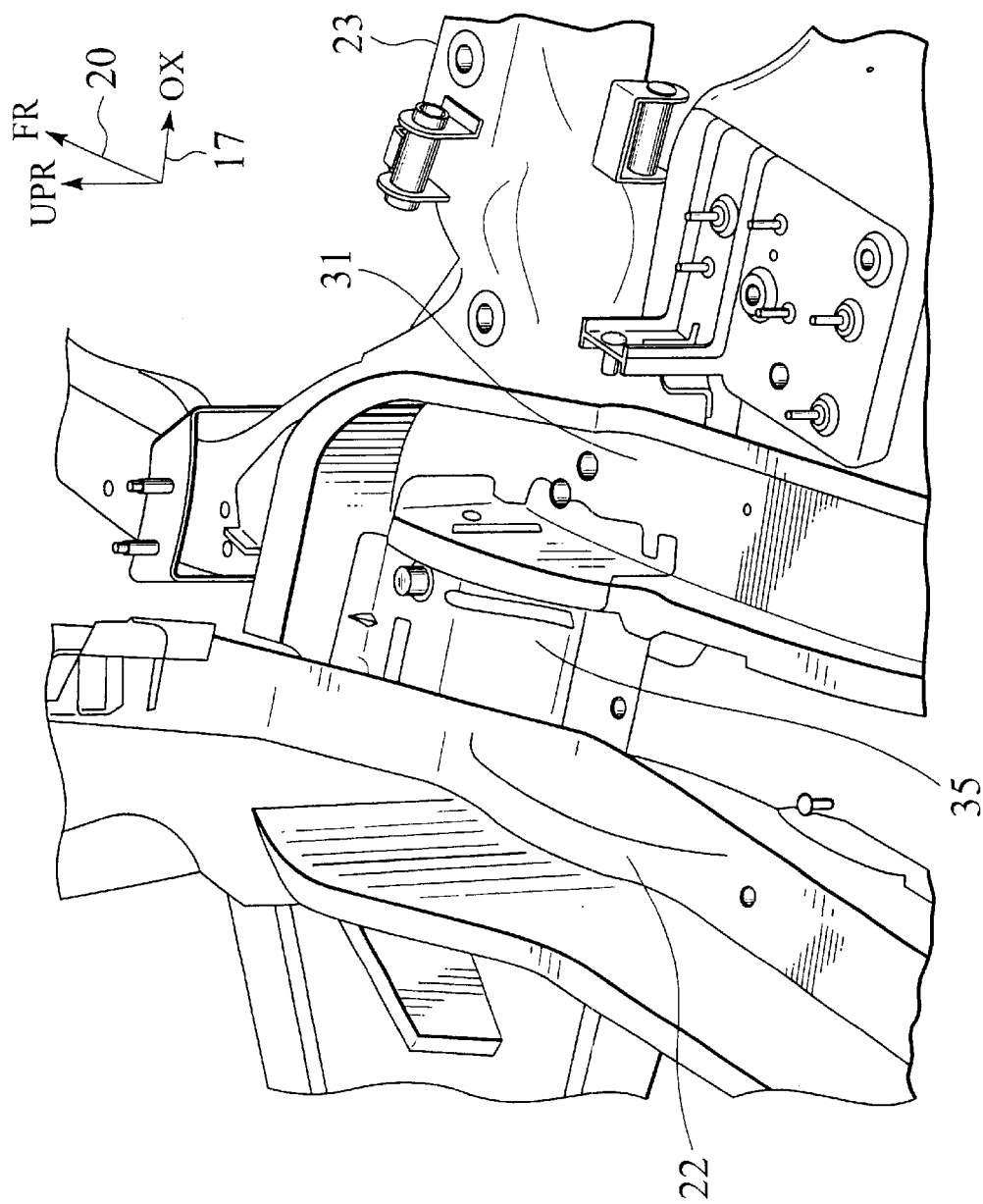
FIG. 4 is a partially enlarged perspective view of the suspension fitting portion of FIG. 3.
Figure 5:
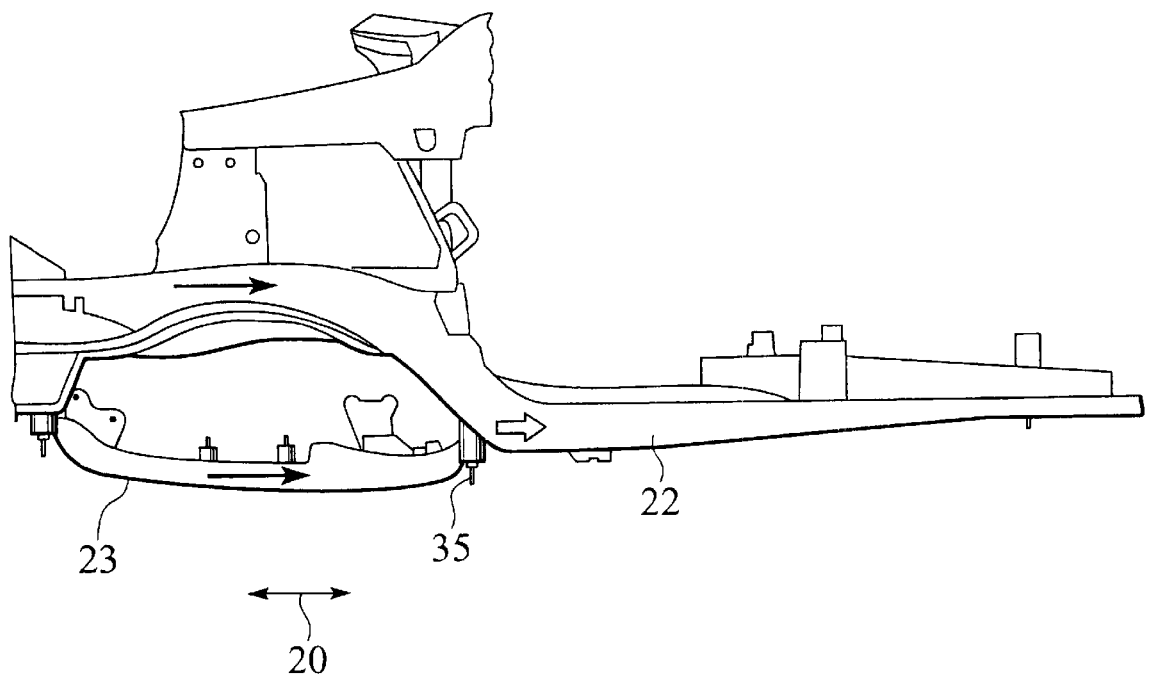
FIG. 5 is a side view of the vehicle front body structure of FIG. 1.
Figure 6:
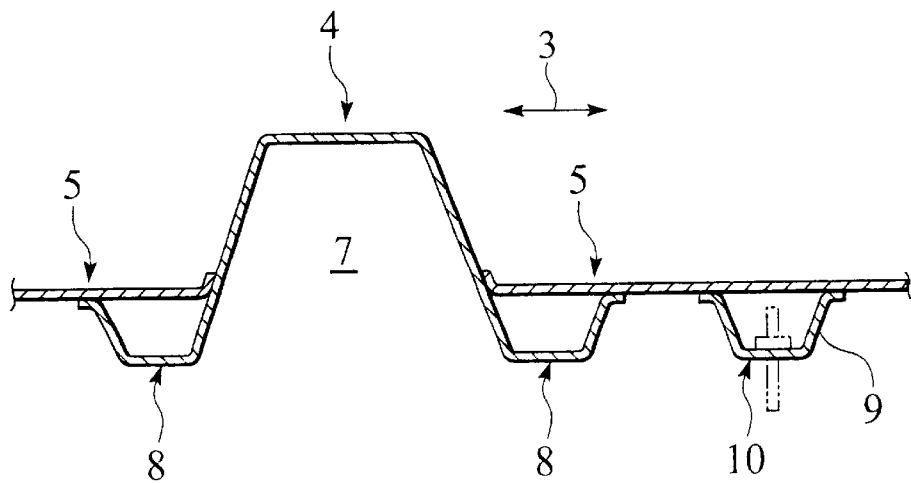
FIG. 6 is a cross-sectional view of a conceivable vehicle front body structure taken along a vehicle transverse direction thereof.
Figure 7:
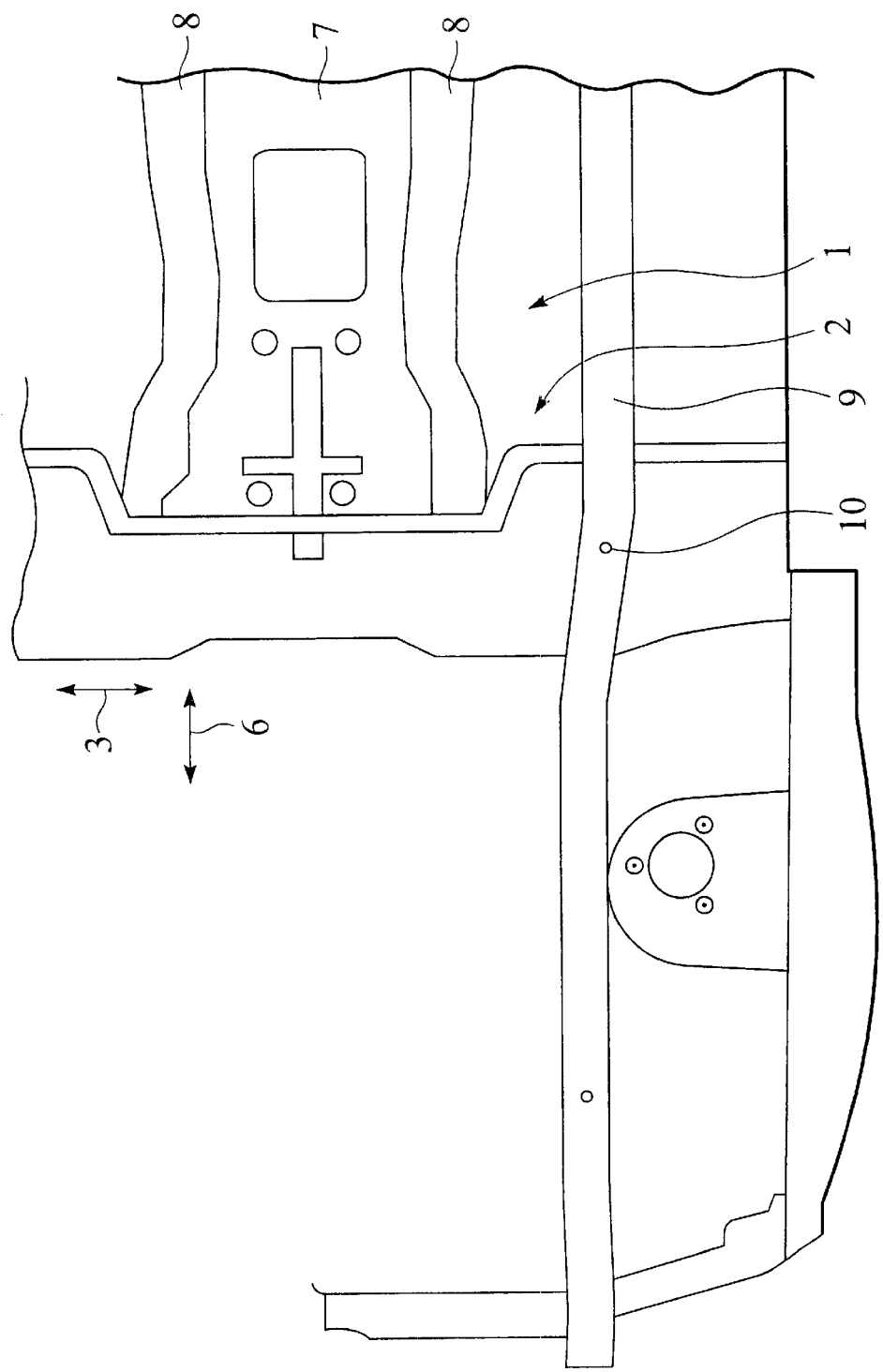
FIG. 7 is a bottom view of the vehicle front body structure of FIG. 6.

An embodiment of the present invention will be explained below with reference to the drawings, wherein like members are designated by like reference characters.

A front floor 15 and a dash floor 16 of a vehicle are composed of a center floor panel 18 at a central region in a vehicle transverse direction 17 of the floors 15 and 16, and floor panels 19 on transversely outer sides of the center floor panel 18. On a central section of the center floor panel 18, a floor tunnel 21 bent upward into a convex shape, extends in a vehicle longitudinal direction 20.

Under the floor panels 19 on the both sides, a pair of front side members 22 extend in the vehicle longitudinal direction 20.

A sub-frame 23 (a curb sub-frame) is provided between front parts of the pair of the front side members 22. The sub-frame 23 is fixed to the front side members 22 at a pair of front fixing points 24 and a pair of rear fixing points 25 of the sub-frame 23. A distance between the front fixing points 24 in the vehicle transverse direction 17 is longer than the relevant distance between the rear fixing points 25, and the rear fixing points 25 are located on inner side in the vehicle transverse direction 17 of the front fixing points 24 (closer to the center than the front fixing points 24).

A pair of reinforcing members 31, which are extending substantially parallel to straight lines each passing through the front and rear fixing points 24 and 25 of the sub-frame 23 on the same side in the vehicle transverse direction 17, are respectively joined to the center floor panel 18 and the floor panel 19. A front end of each reinforcing member 31 is joined to a vicinity of the rear fixing point 25 of the sub-frame 23; meanwhile, a rear end of the reinforcing member 31 is joined to the floor tunnel 21.

The rear fixing points 25 (a suspension fitting portion 35) of the sub-frame 23 are respectively interposed between the front ends of the reinforcing members 31 and the front side members 22.

The reinforcing members 31 have a function of a propeller shaft support. The propeller shaft support brackets 32 are provided on the reinforcing members 31 for supporting a propeller shaft (not shown).

The reinforcing members 31 are provided substantially parallel to the straight lines each passing through the front fixing point 24 and the rear fixing point 25 of the sub-frame 23 on the same side in the vehicle transverse direction 17, and the front ends of the reinforcing members 31 are joined to the vicinity of the rear fixing point 25 of the sub-frame 23 and the rear ends of the reinforcing members 31 are joined to the floor tunnel 21. Accordingly, as shown in FIG. 1, the reinforcing members 31 are subject to axial loads F1 and create large reaction force F2 in the event of an offset collision. Here, stress $\sigma$ of the reaction force to the axial load is expressed by the formula $\sigma = \pi EI / l^2 A$, in which $\pi$ denotes the circle ratio, E denotes the elastic modulus, I denotes the geometrical moment of inertia and A denotes a cross-sectional area.

On the contrary, in the event of a full-lap collision, the reinforcing members 31 are subject to loads F3 in a bending mode as illustrated with chain double-dashed lines and create small reaction force F4. Here, stress σb of the reaction force to the bending load is expressed by the formula σb=M/Z, in which M denotes the bending moment and Z denotes the section modulus.

Moreover, since the rear fixing points 25 (the suspension fitting portions 35) of the sub-frame 23 are respectively interposed between the front ends of the reinforcing members 31 and the front side members 22, the load of collision is effectively distributed to the reinforcing members 31 and the front side members 22. In addition, drivability is improved as rigidity of suspension fitting portions 35 is enhanced.

Furthermore, since the propeller shaft support bracket 32 are provided on the reinforcing members 31, rigidity of a fitting point of the propeller shaft is improved.

The present disclosure relates to subject matter contained in Japanese Patent Application No. 2001-333966, filed on Oct. 31, 2001, the disclosure of which is expressly incorporated herein by reference in its entirety.

The preferred embodiment described herein is illustrative and not restrictive, and the invention may be practiced or embodied in other ways without departing from the sprit or essential character thereof. The scope of the invention being indicated by the claims, and all variations which come within the meaning of claims are intended to be embraced herein.

What is claimed is:

1. A vehicle front body structure comprising:
   a floor panel with a floor tunnel extending in a vehicle longitudinal direction;
   front side members provided under the floor panel, extending in the vehicle longitudinal direction;
   a sub-frame fixed at its front and rear fixing points to the front side members, the rear fixing points being located on inner side in a vehicle transverse direction of the front fixing points; and
   reinforcing members fixed to the floor panel, each extending substantially in parallel to a straight line passing through the front and rear fixing points on transversely same side of the sub-frame, a front part thereof connected to a vicinity of the rear fixing point of the sub-frame and a rear part thereof connected to the floor tunnel of the floor panel.

2. The vehicle front body structure according to claim 1, wherein the rear fixing points of the sub-frame are interposed between the reinforcing member and the front side member.

3. The vehicle front body structure according to claim 1, wherein the reinforcing member has a function of a propeller shaft support.

4. A vehicle front body structure comprising:
   a center floor panel at a central region in a vehicle transverse direction of a front floor and a dash floor, provided on its central section with a floor tunnel bent upward into a convex shape, extending in a vehicle longitudinal direction;
   floor panels on transversely outer sides of the center floor panel;
   a pair of front side members under the floor panels, extending in the vehicle longitudinal direction;
   a sub-frame provided between front parts of the pair of the front side members, and fixed to the front side members at a pair of front fixing points and a pair of rear fixing points of the sub-frame, a distance between the front fixing points in the vehicle transverse direction being longer than a distance between the rear fixing points in the vehicle transverse direction, and the rear fixing points being located on inner side in the vehicle transverse direction of the front fixing points;
   a pair of reinforcing members extending substantially parallel to straight lines each passing through the front and rear fixing points of the sub-frame on the same side in the vehicle transverse direction, respectively joined to the center floor panel and the floor panel, with a front end of each reinforcing member joined to a vicinity of the rear fixing point of the sub-frame and a rear end of the reinforcing member joined to the floor tunnel; and
   propeller shaft support brackets for supporting a propeller shaft provided on the reinforcing members,
   wherein the rear fixing points of the sub-frame are respectively interposed between the front ends of the reinforcing members and the front side members.

* * * * *

UNITED STATES PATENT AND TRADEMARK OFFICE
CERTIFICATE OF CORRECTION

PATENT NO.     : 6,588,832 B2
DATED          : July 8, 2003
INVENTOR(S)    : Wataru Sakuma It is certified that error appears in the above-identified patent and that said Letters Patent is hereby corrected as shown below:

<u>Title page,</u>
Please add -- [30] Foreign Application Priority Data, Oct. 31, 2001 (JP)
……….. 2001-333966 --

Signed and Sealed this

Ninth Day of December, 2003

JAMES E. ROGAN
*Director of the United States Patent and Trademark Office*